United States Patent Office 3,284,409
Patented Nov. 8, 1966

3,284,409
SUBSTITUTED SUCCINIC ACID-BORON-ALKYL-ENE AMINE PHOSPHATIDE DERIVED ADDITIVE AND LUBRICATING OIL CONTAINING SAME
Casper John Dorer, Lyndhurst, Ohio, assignor to The Lubrizol Corporation, Wickliffe, Ohio, a corporation of Ohio
No Drawing. Filed June 22, 1965, Ser. No. 466,089
15 Claims. (Cl. 252—49.9)

This invention relates to boron-containing compositions and processes for preparing the same. More particularly it relates to boron-containing compositions which are useful as additives in hydrocarbon oils and lubricants, especially lubricants intended for use in internal combustion engines, gear assemblies and power-transmitting units.

Oil-soluble boron-containing compositions, such as the boron-containing, acylated amines shown in U.S. Patent No. 3,087,936, have found use in lubricants as additives to impart oxidation-inhibiting, corrosion-inhibiting, and detergent properties. They are especially effective to reduce the tendency of lubricants to form sludge or varnish deposits when the lubricants are used in engines operated at alternatingly high and low temperatures. Accordingly, lubricants containing such additives are desirable for use in the crankcases of taxicabs, delivery trucks, police cruisers, and other automotive vehicles. The effectiveness of the boron-containing additives is believed to be associated to a large extent with the presence of boron in their molecular structure. Hence, it is desirable to have processes whereby a large amount of boron can be incorporated into lubricant additives.

In some instances it has been found that the boron-containing substances are susceptible to decomposition under hydrolytic conditions, especially at high temperatures. Such decomposition is usually accompanied by the formation of a volatile boron product which tends to escape from the lubricant at temperatures to which the lubricant is subject in service; or it may result in the formation of a crystalline, oil-insoluble boron-containing product which tends to separate from the lubricant. While the decomposition product is not harmful to the equipment being lubricated, the effectiveness of the lubricant is diminished because of such loss of boron.

Accordingly, it is an object of this invention to provide boron-containing compositions which are resistant to decomposition.

It is another object of this invention to provide novel compositions of matter.

It is another object of this invention to provide compositions useful as additives in hydrocarbon oils and lubricants.

It is further an object of this invention to provide a process for preparing boron-containing compositions.

It is also an object of this invention to provide lubricating compositions.

It is also an object of this invention to provide hydrocarbon oil compositions.

It is further an object of this invention to provide fuel compositions.

These and other objects are attained in accordance with this invention by providing a composition comprising (A) a boron-containing product obtained by the reaction of a hydrocarbon-substituted succinic acid compound having at least about 50 aliphatic carbon atoms in the hydrocarbon substituent, at least about 0.5 equivalent of an alkylene amine, and at least about 0.1 equivalent of a boron reactant selected from the class consisting of boron acids, boron oxide, boron halides, ammonium salts of boron acids and esters of boron acids with monohydric alcohols and (B) from about 0.01 to about 3 moles, per mole of boron in said boron-containing product of (A), of a phosphatide.

COMPONENT A

As indicated previously the boron-containing product of A is obtained by the reaction of a high molecular weight hydrocarbon-substituted succinic acid compound, an alklene amine, and a boron reactant. The reaction is preferably carried out by first acylating the amine with the succinic acid compound and then reacting the acylated amine with the boron reactant. Alternatively the reaction may be effected by mixing the three reactants and maintaining the reaction mixture at the desired temperature, or by first reacting the amine with the boron reactant and then with the succinic acid compound. The acylation of the amine or the intermediate reaction product of the amine and the boron reactant with the succinic acid compound usually is carried out at a temperature above about 80° C., preferably within the range from about 100° C. to about 250° C. In some instances, however, a lower acylation temperature such as 25° C. or thereabout may be used. Likewise, the reaction of the alkylene amine or the acyalted amine with the boron reactant may be accomplished at 25° C. or even lower, the preferred temperature being from about 50° C. to about 250° C. In either reaction, the upper limit of temperature is the decomposition point of the particular reaction mixture.

The above reactions are preferably carried out in the presence of a diluent or solvent such as benzene, toluene, naphtha, cyclohexane, n-hexane, chlorobenzene, dioxane or any other inert solvent. Mineral oil is particularly useful.

The precise chemical constitution of the boron-containing product of A is not fully understood. It is known, however, that the product is characterized by the presence within its molecular structure of succinic-nitrogen radicals as well as boron-nitrogen radicals. The succinic-nitrogen radicals may be those of a salt linkage.

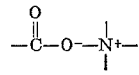

an amide or imide linkage

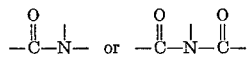

or an amidine linkage

The amidine linkage may be that of a cyclic amidine linkage such as is found in imidazolines. Also, the linkages present in the product of A are usually a mixture of the above-illustrated linkages and often include polymeric salt, amide, imide, or amidine linkages. The boron-nitrogen linkage in the product of A is believed to be that of a complex. In some instances, it may involve more than one atomic proportion of boron with one atomic proportion of nitrogen and in other instances more than one atomic proportion of nitrogen with one atomic proportion of boron. The nature of the complex is not understood. Evidence appears to indicate that the complex results from a direct linkage between the boron and the nitrogen atoms and that the substitutents originally attached to the boron and the nitrogen atoms do not take part directly in the complex formation. However, in the case of a boron acid as the reactant, the formation of the complex is often accompanied with the formation of water.

The hydrocarbon-substituted succinic acid compound useful in preparing the boron-containing product of A is preferably an acid or anhydride in which the hydrocarbon substituent contains at least about 50 aliphatic carbon atoms. The sources of the hydrocarbon substituent include principally the high molecular weight substantially saturated petroleum fractions and substantially saturated olefin polymers, particularly polymers of monoolefins having from 2 to 30 carbon atoms. The especially useful polymers are the polymers of 1-mono-olefins such as ethylene, propene, 1-butene, isobutene, 1-hexene, 1 octene, 2-methyl-1heptene, 3-cyclohexyl-1-butene, and 2-methyl-5-propyl-1-hexene. Polymers of medial olefins, i.e., olefins in which the olefinic linkage is not at the terminal position, likewise are useful. They are illustrated by 2-butene, 3-pentene, and 4-octene.

Also useful are the interpolymers of the olefins such as those illustrated above with other interpolymerizable olefinic substances such as aromatic olefins, cyclic olefins, and polyolefins. Such interpolymers include, for example, those prepared by polymerizing isobutene with styrene; isobutene with butadiene; propene with isoprene; ethylene with piperylene; isobutene with chloroprene; isobutene with p-methyl styrene; 1-hexene with 1,3-hexadiene; 1-octene with 1-hexene; 1-heptene with pentene; 3-methyl-1-butene with 1-octene; 3,3-dimethyl-1-pentene with 1-hexene; isobutene with styrene and piperylene; etc.

The relative proportions of the mono-olefins to the other monomers in the interpolymers influence the stability and oil-solubility of the final products derived from such interpolymers. Thus, for reasons of oil-solubility and stability the interpolymers contemplated for use in this invention should be substantially aliphatic and substantially saturated, i.e., they should contain at least about 80%, preferably at least about 95%, on a weight basis, of units derived from the aliphatic monolefins and no more than about 5% of olefinic linkages based on the total number of carbon-to-carbon covalent linkages. In most instances, the percentage of olefinic linkages should be less than 2% of the total number of carbon-to-carbon covalent linkages.

Specific examples of such interpolymers include the copolymer of 95% (by weight) of isobutene with 5% of styrene; the terpolymer of 98% of isobutene with 1% of piperylene and 1% of chloroprene; the terpolymer of 95% of isobutene with 2% of 1-butene and 3% of 1-hexene; the terpolymer of 80% of isobutene with 10% of 1-pentene and 10% of 1-octene; the copolymer of 80% of 1 hexene and 20% of 1-heptene; the terpolymer of 90% of isobutene with 2% of cyclohexene and 8% of propene; and the copolymer of 80% of ethylene and 20% of propene.

Another source of hydrocarbon radicals comprises saturated aliphatic hydrocarbons such as highly refined high molecular weight white oils or synthetic alkanes such as are obtained by hydrogenation of high molecular weight olefin polymers illustrated above or high molecular weight olefinic substances.

The use of olefin polymers having molecular weights of about 750–5000 is preferred. Higher molecular weight olefin polymers having molecular weights from about 10,000 to about 100,000 or higher have been found to impart viscosity index improving properties to the final products of this invention. The use of such higher molecular weight olefin polymers often is desirable. It will be noted that the hydrocarbon substituent in the succinic acid likewise may contain inert polar groups. Thus, in this respect, it may be a radical which is substantially hydrocarbon in character, i.e., the polar groups are not present in proportion sufficiently large to alter the hydrocarbon character of the hydrocarbon substituent. The polar groups are exemplified by chloro, bromo, keto, ether, aldehyde, nitro, etc. The upper limit with respect to the proportion of such polar groups in a hydrocarbon substituent is usually about 10% based on the weight of the hydrocarbon portion of the substituent.

The succinic acids are readily available from the reaction of maleic anhydride with a high molecular weight olefin or a chlorinated hydrocarbon such as the olefin polymer described hereinabove. The reaction involves merely heating the two reactants at a temperature about 100°–200° C. The product from such a reaction is a succinic anhydride having a large hydrocarbon substituent. The hydrocarbon substituent may contain olefinic linkages which may be converted, if desired, to saturated, paraffinic linkages by hydrogenation. The anhydride may be hydrolyzed by treatment with water or steam to the corresponding acid. It will be noted in this regard that the anhydride is equivalent to the acid insofar as its utility in the preparation of the product of A is concerned. In fact, the anhydride is often more reactive than the acid and is often preferred. Other succinic acid compounds likewise are useful, especially the succinic halides such as chlorides or bromides and succinic esters derived from alcohols or phenols having less than about 30 aliphatic carbon atoms such as methanol, ethanol, octanol, dodecanol, phenol, naphthol, cresol, hexylphenol, etc.

In lieu of the olefins or chlorinated hydrocarbons, other hydrocarbons containing an activating polar substituent, i.e., a substituent which is capable of activating the hydrocarbon molecule in respect to reaction with maleic acid or anhydride, may be used in the above-illustrated reaction for preparing the succinic acid. Such polar substituents may be illustrated by sulfide, disulfide, nitro, mercaptan, bromine, ketone, or aldehyde radicals. Examples of such polar-substituted hydrocarbons include polypropene sulfide, di-polyisobutene disulfide, nitrated mineral oil, di-polyethylene sulfide, brominated polyethylene, etc. Another method useful for preparing the succinic acids and anhydrides involves the reaction of itaconic acid with a high molecular weight olefin or a polar-substituted hydrocarbon at a temperature usually within the range from about 100° C. to about 200° C.

The alkylene amines useful in preparing the boron-containing product of A conform for the most part to the formula

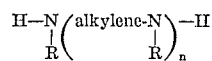

wherein $n$ is an integer preferably less than about 10, R is a substantially hydrocarbon or hydrogen radical, and the alkylene radical is preferably a lower alkylene radical having less than about 8 carbon atoms. The alkylene amines include principally methylene amines, ethylene amines, butylene amines, propylene amines, pentylene amines, hexylene amines, heptylene amines, octylene amines, other polymethylene amines, and also the cyclic and the higher homologs of such amines such as piperazines and amino-alkyl-substituted piperazines. They are exemplified specifically by: ethylene diamine, triethylene tetramine, propylene diamine, decamethylene diamine, octamethylene diamine, di(heptamethylene)triamine, tripropylene tetramine, tetraethylene pentamine, trimethylene diamine, pentaethylene hexamine, di(trimethylene)triamine, 2-heptyl-3-(2-aminopropyl)imidazoline, 4-methylimidazoline, 1,3 - bis(2 - aminoethyl)imidazoline, pyrimidine, 1-(2-aminopropyl) piperazine, 1,4-bis(2-aminoethyl)piperazine, and 2-methyl-1-(2-aminobutyl)piperazine. Higher homologs such as are obtained by condensing two or more of the above-illustrated alkylene amines likewise are useful.

The ethylene amines are especially useful. They are described in some detail under the heading "Ethylene Amines" in "Encyclopedia of Chemical Technology," Kirk and Othmer, volume 5, pages 898–905, Interscience Publishers, New York (1950). Such compounds are prepared most conveniently by the reaction of an alkylene chloride with ammonia. The reaction results in the production of somewhat complex mixtures of alkylene amines, including cyclic condensation products such as piperazines. These mixtures find use in the process of this invention. On the other hand, quite satisfactory products may be obtained also by the use of pure alkylene amines. An especially useful alkylene amine for reasons of economy as well as effectiveness of the products derived therefrom is a mixture of ethylene amines prepared by the reaction of ethylene chloride and ammonia and having a composition which corresponds to that of tetraethylene pentamine.

The boron compounds useful as the reactant in the above process for preparing the product of A include boron oxide, boron oxide hydrate, boron trifluoride, boron tribromide, boron trichloride, boron acids such as boronic acid (e.g., alkyl-B(OH)$_2$ or aryl-B(OH)$_2$), boric acid (i.e., H$_3$BO$_3$), tetraboric acid (i.e., H$_2$B$_4$O$_7$), metaboric acid (i.e., HBO$_2$), ammonium salts of boron acids, and esters of boron acids with volatile, monohydric alcohols and esters of boron acids with monohydric phenols. The use of complexes of a boron trihalide with ethers, ammonia, organic acids, inorganic acids, or hydrocarbons is a convenient means of introducing the boron reactant into the reaction mixture. Such complexes are known and are exemplified by boron trifluoride-diethyl ether, boron trifluoride-phenol, boron trifluoride-phosphoric acid, boron trichloride-chloroacetic acid, boron tribromide-dioxane, and boron trifluoride-methyl ethyl ether.

Specific examples of boronic acids include methyl boronic acid, phenyl boronic acid, cyclohexyl boronic acid, p-heptylphenyl boronic acid and dodecyl boronic acid, di-heptylphenyl boronic acid, polyisobutene (molecular weight of 3000)-substituted phenyl boronic acid, and naphthyl boronic acid.

The boron acid esters include especially mono-, di-, and tri-organic esters of boric acid with volatile monohydric alcohols or phenols such as, e.g., methanol, ethanol, isopropanol, cyclohexanol, cyclopentanol, i-octanol, 2-octanol, 2-butyl cyclohexanol, and other monohydric alcohols preferably boiling below about 150° C. Lower monohydric alcohols, those having less than about 6 carbon atoms, are especially useful for preparing the boric acid ester reactants for the purpose of this invention. Monohydric phenols include phenol, o-cresol, p-cresol and m-cresol.

Methods for preparing the esters of boron acid are known and disclosed in the art (such as "Chemical Reviews" pages 959–1064, volume 56). Thus, one method involves the reaction of boron trichloride with 3 moles of an alcohol to result in a tri-organic borate. Another method involves the reaction of boric oxide with an alcohol. Another method involves the direct esterification of tetra boric acid with 3 moles of an alcohol.

The ammonium salts of boron acids include principally the salts of boric acid with ammonia or lower alkylamines, i.e., mono-, di-, or tri-alkyl amines having less than 12 carbon atoms in each alkyl radical. Salts of ammonia or such amines with any other boron acid illustrated above are also useful. It is often desirable to use a mixture of an ammonium salt and at least a molar amount of water. Water tends to cause at least partial hydrolysis of the salt, so as to liberate a boron acid. Thus, the use of a mixture of an ammonium salt and water in many instances is an expedient method of introducing a boron acid into the reaction mixture. Specific examples of ammonium salts include the ammonium salt of boric acid; a mixture of one mole of ammonium salt of boric acid and three moles of water; a mixture of one mole of mono-methylamine salt of boric acid and one mole of water; trimethylamine salt of boric acid; di-cyclohexylamine salt of boric acid, etc.

The relative proportions of the succinic acid compound, the alkylene amine, and the boron reactant to be used in the process for preparing the boron-containing product of A are such that at least about 0.5 equivalent of the alkylene amine is used for each equivalent of the succinic acid compound and that at least about 0.1 equivalent of the boron reactant is used for each equivalent of the succinic acid compound. The equivalent weight of the alkylene amine is based on the number of amino radicals in the molecule; the equivalent weight of the succinic acid compound is based on the number of carboxyl radicals in the molecule and the equivalent weight of the boron reactant is based on the number of boron-containing radicals in the molecule. For instance, ethylene diamine has two equivalents per mole, tetraethylene pentamine has five equivalents per mole; a substituted succinic acid or anhydride having one succinic acid or anhydride group per molecule has two equivalents per mole, boric acid has one equivalent per mole; boron trifluoride has one equivalent per mole; and boron oxide has two equivalents per mole.

The preferred ratios of the three reactants are such that, for each equivalent of the succinic acid compound, there are from about one to five equivalents of the alkylene amine and from about 0.5 to ten equivalents of the boron reactant. It will be noted that when more than one equivalent of the alkylene amine is used per equivalent of the succinic acid compound, the product may contain free amino groups, i.e., amino groups which do not have a succinic radical attached to the amino nitrogen atom. Thus, a product obtained by the reaction of five equivalents of the alkylene amine and one equivalent of the succinic acid will have one acylated amino radical and four free amino groups. Also, two equivalents of the alkylene amine may react with one equivalent of the succinic acid to form a product having predominantly amidine linkages. On the other hand, 0.5 equivalent of the alkylene amine may react with one equivalent of the succinic acid to form a product having predominantly imide linkages. As regards the boron reactant, more than one atomic proportion of boron may be involved in forming a complex with one atomic proportion of nitrogen of a nitrogen radical. In most instances, the preferred product of A is formed by reaction of from up to about 10 equivalents of the alkylene amine and up to about ten equivalents of the boron reactant with one equivalent of the succinic acid compound.

The following examples are illustrative of methods for preparing the boron-containing product of A useful in the preparation of the process of this invention.

*Example A*

A mixture of 272 grams (0.5 equivalent) of a polyisobutene-substituted succinic anhydride having an acid number of 104 (prepared by the reaction of a chlorinated polyisobutene having a chlorine content of 4% and a molecular weight of 1000 with 1.2 molar proportions of maleic anhydride at 200° C.), 310 grams (5 equivalents) of boric acid and 819 grams of mineral oil is mixed with 81 grams (1 equivalent) of hexamethylene diamine (72% purity). The resulting mixture is heated at 150°–160° C. for 4 hours and then at 190°–200° C. for 2.5 hours while water is being distilled off. The residue is filtered and the filtrate is a 60% mineral oil solution of the product having a boron content of 1.8% and a nitrogen content of 0.7%.

*Example B*

A mixture of 2 equivalents (gram equivalents) of a commercial ethylene amine mixture having an average composition corresponding to that of tetraethylene pentamine, 2 equivalents of boric acid, and 1 equivalent of the polyisobutene-substituted succinic anhydride of Example A is prepared in the presence of 40% (based on the weight of the total mixture) of mineral oil. The resulting mixture is blown with nitrogen at 150° C. for 3 hours and filtered. The filtrate is found to have a nitrogen content of 2.7% and a boron content of 1.4%.

*Example C*

A mixture of 1 equivalent (gram equivalent) of polypropene (molecular weight of 3000)-substituted succinic acid and 3 equivalents of boric acid is treated with 2 equivalents of tetraethylene pentamine in the presence of 1000 grams of mineral oil at room temperature. The resulting mixture is heated at 20°–180° C. while water is collected as the distillate. The residue is filtered and the filtrate is a mineral oil solution of the desired product.

*Example D*

A mixture of 200 grams of a commercial N-octadecyl propylene diamine, 31 grams (0.5 equivalent) of boric acid, and 500 ml. of decyl alcohol (solvent) is heated at 150° C. for 6 hours while water is being distilled off. To this intermediate there is added 282 grams (0.51 equivalent) of a polyisobutene-substituted succinic anrydride (having an acid number of 103 and prepared by the reaction of maleic anhydride and a chlorinated polyisobutene having a molecular weight of 1000 and a chlorine content of 4.3%, at 200° C.) together with 330 grams of mineral oil at 100° C. The mixture is heated at 150° C. for 6 hours and then to 160°/5 mm. The residue is filtered. The filtrate is a 40% oil solution of the product and is found to have a boron content of 0.6% and a nitrogen content of 1.4%.

*Example E*

An intermediate is obtained by heating at 110°–120° C. for 4 hours, a mixture of 65 grams (1.2 equivalents) of phenylene diamine, 143 grams (0.6 equivalent) of triisobutyl ester of boric acid, and 560 grams of mineral oil. To this intermediate there is added 638 grams (0.6 equivalents) of a polyisobutene-substituted succinic anhydride (having an acid number of 52.7 and prepared as described in Example D from a polyisobutene having a molecular weight of 11,000). The resulting mixture is heated at 150°–160° C. for 8 hours and filtered. The filtrate is heated to 150° C./20 mm. The residue is again filtered. The filtrate is a 54% oil solution of the product and has a boron content of 0.27% and a nitrogen content of 0.3%.

*Example F*

A mixture of 280 grams (4.8 equivalents) of hexamethylene diamine, 78 grams (1.25 equivalents) of boric acid, and 550 grams of mineral oil is heated at 110°–120° C. for 2 hours. The resulting intermediate is mixed with a toluene solution of a polypropene-substituted succinic anhydride in which the polypropene has a molecular weight of 910 (578 grams, 1.25 equivalents). The mixture is heated at 110°–120° C. for 6 hours whereupon water is collected by azeotropic distillation. The residue is then heated to 150° C./20 mm. and filtered. The filtrate is a 40% solution of the desired product.

*Example G*

A boron trifluoride-diethyl ether complex containing 48% of boron trifluoride (47 grams, 0.33 equivalent) is added to a mixture of 633 grams of mineral oil and 43 grams (0.66 equivalent) of N-aminoethyl piperazine at 25°–35° C. throughout a period of 1 hour. The mixture is heated at 40°–50° C. for 2 hours to form an intermediate. The intermediate is then mixed with 888 grams (0.5 equivalent) of a 29% oil solution of an (isobutene-styrene) copolymer-substituted succinic anhydride (having an acid number of 32 and prepared from a copolymer of isobutene and styrene in weight ratio of 90:10 and having a molecular weight of 15,000). The resulting mixture is heated at 150° C. for 3 hours and filtered. The filtrate is a 57% oil solution of the desired product having a boron content of 0.1% and a nitrogen content of 0.5%.

*Example H*

Boric acid (62 grams, 1 equivalent) is added at 50° C. to a solution of 72 grams of tetraethylene pentamine in 1000 grams of butanol. The mixture is heated at reflux for 6 hours whereupon 53 grams of water is distilled off. To the residue there is added a solution of 555 grams (1 equivalent) of the polyisobutene-substituted succinic anhydride of Example D in 412 grams of mineral oil. The resulting mixture is heated at 120° C. for 6 hours whereupon 9 grams of water is distilled off. The residue is heated to 150° C./20 mm. and is found to have a boron content of 0.72% and a nitrogen content of 2.2%.

*Example I*

A polyisobutene-substituted succinic anhydride (2.5 equivalents), having an acid number of 101 and prepared as described in Example A, an amine mixture (5 equivalents) consisting of 75% (by weight) of triethylene tetramine and 25% of diethylene triamine, and mineral oil (40% by weight of the total reaction mixture) are mixed at 60°–80° C. and the mixture is heated to 150° C. while it is blown with nitrogen. The mixture is heated at 150° C. for 8 hours. Water is removed as the distillate. The residue (having a nitrogen content of 2.6%) (1645 grams) and an oleyl ester of boric acid (344 grams; prepared by heating an equi-molar mixture of oleyl alcohol and boric acid in toluene at reflux temperature while water is removed azeotropically and thereafter heating the mixture to 150° C./20 mm., the residue being the ester having a boron content of 3.2%) are heated at 150° C. for 6 hours and then filtered. The filtrate has a boron content of 0.6% and a nitrogen content of 1.74%.

*Example J*

Boron trifluoride (34 grams) is bubbled throughout a period of 3 hours into 1400 grams of a product at 80° C., prepared by heating at 150° C. a mixture containing 40% by weight of a mineral oil, the polyisobutene-substituted succinic anhydride of Example A, and a commercial amine mixture having an average composition corresponding to that of tetraethylene pentamine (1 equivalent per equivalent of the anhydride). The resulting mixture is blown with nitrogen at 70°–80° C. for 2 hours and diluted with 23 grams of mineral oil. The residue has a boron content of 0.42%, a fluorine content of 1.58%, and a nitrogen content of 1.41%.

*Example K*

A complex (67.3 grams) of phosphoric acid and 3 moles of boron trifluoride is added dropwise to a mixture of 432 grams of mineral oil and 1344 grams of a product prepared by heating at 150° C. a mixture containing 40% by weight of mineral oil, the polyisobutene-substituted succinic anhydride of Example A and a comercial ethylene amine mixture having an average composition corresponding to that of tetraethylene pentamine (1.5 equivalents per equivalent of the anhydride). An exothermic reaction occurs. The reaction mixture is heated at 80°–90° C. for 0.5 hour and mixed with 520 cc. of benzene. The resulting solution is washed successively, with 500 cc. of water, a mixture of 500 cc. of water and 250 cc. of isopropyl alcohol, 50 cc. of a saturated sodium chloride solution, and a mixture of 750 cc. of water and 250 cc. of isopropyl alcohol. The washed product is heated to 150° C./38–68 mm. within a period of 6 hours, cooled and filtered. The filtrate has a nitrogen content of 1.34% and a boron content of 0.1%.

*Example L*

The procedure of Example C is repeated except that boric acid is replaced with boron oxide (3 equivalents).

*Example M*

The procedure of Example C is repeated except that boric acid is replaced with the monomethylamine salt of boric acid (5 equivalents).

COMPONENT B

The phosphatides useful as Component B in this invention are phosphorus-containing lipides such as lecithin or cephalin. Phosphatides which are especially useful are the ones having the structural formula

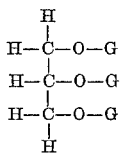

wherein G is selected from the class consisting of fatty acyl radicals, phosphorus containing radicals having the structural grouping

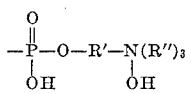

and phosphorus containing radicals having the structural grouping

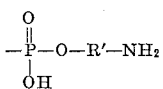

wherein R' is a lower alkylene radical having from 1 to about 10 carbon atoms and R'' is a lower alkyl radical having from 1 to 4 carbon atoms, and at least one of the G radicals is a said phosphorus-containing radical. The fatty acyl radicals are for the most part those derived from fatty acids having from 8 to 30 carbon atoms in the fatty radicals, e.g., octanoic acid, stearic acid, oleic acid, palmitic acid, behenic acid, myristic acid, and oleostearic acid. Especially desirable radicals are those derived from commercial fatty compounds such as soybean oil, cotton seed oil, peanut oil, coffee bean oil, castor seed oil and rapeseed oil.

Soybean lecithin is particularly useful for reasons of commercial availability and their effectiveness for the purposes of the invention. It contains about two-thirds of phosphatide and one-third of a glyceride oil and has a phosphorus content of about 2.0%, a nitrogen content of about 1%, and a moisture content of about 1%. It is described in detail in Encyclopedia of Chemical Technology, Kirk and Othmer, volume 8, pages 309–326 (1952).

As indicated previously, the composition of the invention comprises two components. Component A is a boron-containing product useful in an organic composition, e.g., hydrocarbon or lubricating composition, and Component B is a substance capable of reducing the tendency of such composition to lose boron when the product of A is present therein as an additive. To accomplish the purpose, Component B may be added to such organic composition in which there is already incorporated the boron-containing product of A. Or it may be mixed with the boron-containing product of A and the mixture then incorporated in the organic composition. In many instances, where the organic composition is a lubricant, it has been found advantageous to prepare a mixture of Components A and B and heat the mixture for a period, usually less than about 30 hours, at a temperature up to about 250°–300° C. before incorporating the mixture in a lubricant. The heat treatment, especially when it is carried out at a temperature above about 100° C., usually results in a reaction between the two components. The nature of such reaction, if it occurs, is not fully understood. It is known, however, that the heat treatment results in a more homogeneous product even though the two components do not appear to be completely miscible with each other. In some cases, a volatile by-product such as water or a hydrogen halide is formed by the heat treatment. The by-product is usually separated before the heated mixture is incorporated in a lubricant.

A particularly convenient method for preparing the compositions of this invention consists of preparing a mixture of Components A and B and a limited quantity of mineral oil and heating the resulting mixture to a temperature between about 100° C. to 300° C. to form a homogeneous concentrate. The amount of the oil in the concentrate may be as little as 1% or as much as 50% or more. The concentrate is then diluted with an additional quantity of mineral oil to form the final lubricant. The temperature at which the concentrate usually is heated is preferably within the range from about 150° C. and 250° C. The upper limit of the temperature is the decomposition point of the components in the mixture.

The relative amount of Components A and B are most conveniently described in terms of a molar ratio of Component B to the boron present in the boron-containing product of Component A. The ratio may vary from about 0.01:1 to about 3:1 and is preferably within the range from about 0.1:1 to about 2:1. An amount of Component B less than 0.01 mole per mole of the boron in Component A is not effective to reduce the tendency of a lubricant to lose boron. On the other hand, if more than three moles of Component B is used per mole of boron in Component A, the excess appears to be without any additional benefit.

The following examples illustrate the preparation of the compositions of this invention (all percentages are by weight unless otherwise specified).

*Example 1*

A boron-containing Component A is prepared as follows: A mixture of 508 parts (by weight) of mineral oil, 271 parts of a commercial ethylene amine mixture having an average composition corresponding to that of tetraethylene pentamine, and 1851 parts of the polyisobutene-substituted succinic anhydride of Example A is heated at 120°–125° C. for 2 hours and at 149° C. for 2 hours and is then blown with nitrogen at 149°–154° C. for 5 hours to form an acylated amine. To a slurry of 409 parts of boric acid and 736 parts of mineral oil at 149° C., there is added 2600 parts of the above acylated amine throughout a period of 2 hours. The mixture is heated at 149°–158° C. for 7 hours, mixed with a filter aid and filtered. The filtrate is a boron-containing Component A (oil solution) having a boron content of 1.8–1.9% and a nitrogen content of 2.5%. A composition of this invention is then obtained as follows: To 1275 parts of the boron-containing product and 100 parts of toluene there is added 310 parts (0.2 mole per 2.2 moles of boron of the boron-containing Component A) of soybean lecithin. The resulting mixture is heated from 125° C. to 185° C. in four hours. The residue is heated to 160° C. under vacuum to distill off toluene and then filtered. The filtrate is an oil solution of the desired product.

*Example 2*

A mixture of 1000 grams of the boron-containing Component A of Example 1 and 110 grams of cottonseed lecithin is heated at 210° C. for 4 hours whereupon water is distilled off. The residue is filtered. The filtrate is the desired composition.

*Example 3*

A mixture of 1 equivalent (gram equivalent) of an isobutene-styrene copolymer substituted succinic anhydride having an acid number of 110 and derived from a copolymer of 95 parts (by weight) of isobutene and 5 parts of styrene having an average molecular weight of 1500 and 2 equivalents of ethylene diamine is mixed with an equal volume of mineral oil and heated at 150°–170° C. for 6 hours. To this mixture there is added 2 equivalents of triethylborate. The resulting mixture is heated at 100°–150° C. for 4 hours and filtered. The filtrate is an oil solution of the boron-containing product. A mixture of this product and soybean lecithin (0.5 mole per mole of boron in the boron-containing product) is prepared at room temperature and heated at 100° C. for 6 hours and then filtered. The filtrate is the desired composition.

Example 4

A boron-containing product is prepared by the procedure of Example C except that the boric acid used is replaced with ammonium borate (on an equivalent boron basis) and the tetraethylene pentamine used is replaced with N-aminoethyl piperazine (on an equivalent nitrogen basis). The product is diluted with SAE 20 mineral lubricating oil to form a lubricant having a boron content of 0.022% by weight (equivalent to 0.02 mole percent). To this lubricant there is added 9.5% by weight of soybean lecithin.

Example 5

A boron-containing product is prepared as follows. A 20% mineral oil solution of a polyisobutene- (molecular weight of 60,000) substituted succinic anhydride having an acid number of 50 and trimethylene diamine (2 equivalents per equivalent of the anhydride) is heated at 120°–180° C. for 6 hours and then added to a 10% toluene solution of tricyclohexylborate. The resulting mixture is heated at reflux temperature for 8 hours and thereafter heated to 160° C./2 mm. to distill off all volatile components. The residue is a mineral oil solution of the boron-containing product. To this solution there is added one mole of rapeseed lecithin.

Example 6

A mixture of a polyisobutene-substituted succinic acid (obtained by hydrolyzing the polyisobutene-substituted succinic anhydride of Example A) and octamethylene diamine (2 equivalents per equivalent of the succinic acid) is diluted with an equal volume of xylene, heated at reflux temperature for 4 hours and then mixed with phenyl boronic acid (1 equivalent per equivalent of the succinic acid). The mixture is then heated at reflux temperature whereupon water is removed azeotropically. The residue is mixed with an equal volume of mineral oil and then heated to 150° C./1 mm. The residue is an oil solution of the boron-containing product. A composition of the invention is then obtained by mixing the above oil solution with 1% by weight of soybean lecithin.

Example 7

A substituted succinic anhydride is prepared as described in Example A from a copolymer of 98 parts (by weight) of isobutene and 2 parts of piperylene having a molecular weight of 1000. The anhydride has an acid number of 100. A mixture of 1 equivalent of the anhydride, 0.5 equivalent of triethylene tetramine and 0.5 equivalent of diethylene triamine is mixed with an equal volume of white oil and heated at 120°–200° C. for 4 hours. To this mixture there is added 1 equivalent of tetraboric acid and the resulting mixture is heated at 200° C. for 3 hours. The residue is an oil solution of the boron-containing product. A composition of the invention is then obtained by incorporating into the oil solution 0.5% of soybean lecithin.

Example 8

A mixture of 2076 grams (3.4 molar proportions of boron) of the boron-containing Component A of Example 1 and 109 grams (0.07 mole based upon phosphorus content) of soybean lecithin having a phosphorus content of 2% is blown with nitrogen at 180°–190° C. for 5 hours and 15 minutes whereupon 6 grams of water is distilled off. The residue is filtered. The filtrate is the desired composition (31% oil solution) having a nitrogen content of 2.2% and a boron content of 1.7%.

The principal utility of the compositions of this invention is as additives in hydrocarbon compositions and lubricants to improve their detergent properties and to reduce their tendency to form harmful deposits. Examples of hydrocarbons and lubricants in which the compositions of this invention are useful are gasolines, burner fuel oils, cutting oils, hydraulic fluids and lubricating oils. The lubricating oils may be of synthetic, animal, vegetable or mineral origin. Mineral lubricating oils are preferred by reason of their availability, general excellence and low cost. For certain applications oils belonging to one of the other three groups may be preferred. For instance, synthetic polyester oils such as didodecyl adipate and di-2-octyl sebacate are often preferred as jet engine lubricants. Ordinarily, the lubricating oils preferred will be fluid oils ranging in viscosity from about 40 Saybolt Universal Seconds at 100° F. to about 200 Saybolt Universal Seconds at 210° F.

The concentration of the compositions of this invention as additives in lubricants usually ranges from about 0.1% to about 10% by weight. The optimum concentrations for a particular application depend to a large measure upon the type of service to which the lubricant is to be subjected. For example, lubricants for use in gasoline internal combustion engines may contain from about 0.5% to about 5% of the additive whereas lubricating compositions for use in gears and diesel engines may contain as much as 10% or even more of the additive. Gasolines or burner fuel oils uay contain as little as 0.001% of the composition of this invention.

The ability of Component B to reduce the tendency to lose boron of a lubricant containing the boron-containing Component A is demonstrated by the results of a Boron Evolution Test. By this test, lubricants containing the compositions of this invention are compared with lubricants containing the boron-containing product (i.e., Component A only) from which the compositions of this invention are derived. The test procedure is as follows: Humidified air (obtained by passing air through water at room temperature) is bubbled at a rate of 1 cubic foot per hour through a 100-gram sample of a lubricant consisting of a solvent extracted, mixed Mid-Continent mineral lubricating oil of SAE–20 grade containing 1% (by weight) of a zinc dialkylphosphorodithioate in which the alkyl groups consist of a mixture of 65 mole percent of isobutyl radicals and 35 mole percent of primary-pentyl radicals, and 4% of the test additive at 300° F. throughout a period of 47 hours. The exiting gas, which carries with it the volatilized, boron-containing decomposition products, is passed through 50 cc. of water in a collecting flask where the decomposition products are extracted by water. At the end of the test, the exit tube is washed with 100 cc. of mineral spirits and then with 100 cc. of warm water. The washings are combined with water of the collecting flask. The aqueous layer is separated and analyzed for its boron content. The amount of boron in this layer represents the loss of boron by the lubricant sample. The test results are described in terms of a percentage of the decrease in boron content of the lubricant sample. Thus, a smaller percentage indicates a greater stability of the lubricant sample and a greater effectiveness of Component B to prevent the loss of boron by the lubricant sample.

BORON EVOLUTION TEST RESULTS

| Additive in test lubricant: | Percent boron loss |
| --- | --- |
| Composition of Example 8 | 7.8 |
| The boron-containing product as Component A from which the above composition is derived | 13–14 |

The utility of the compositions of this invention as lubricant additives is shown by the results of the following engine test. This test, which employs a single cylinder spark ignition engine available from the Laboratory Equipment Corporation of Mooresville, Indiana, involves running the engine under constant speed, constant air-fuel ratio, and constant fuel flow conditions for a total of 40 hours subsequent to a break-in period of 4.5 hours. Prior to each test run the engine is thoroughly cleaned, pertinent measurements of engine parts are taken, and a complete set of new piston rings and new copper-lead connecting rod test bearing inserts are installed. The amount of varnish deposits on the piston skirt (rated on a scale from 10 to 0, 10 being completely free of deposits)

is an indication of the effectiveness of the lubricant. By this test, an SAE 30 mineral lubricating oil containing 0.003% (by weight) of a dialkyl silicone anti-foam agent, 0.79% of an 87% mineral oil solution of the zinc dialkyl phosphorodithioate (identified previously), 3.3% of the boron-containing Component A of Example 1 and 1% of an aminoalkyl-phenol prepared from a mixture of 1 mole of heptylphenol, 2 moles of dimethylamine, and 2 moles of formaldehyde, gives a piston skirt varnish deposit rating of 9.7. Another lubricant consisting of SAE-30 mineral lubricating oil, 0.003% of a dialkyl silicone anti-foam agent, 0.79% of an 87% mineral oil solution of the zinc dialkylphosphorodithioate (identified previously), and 2.63% of the composition of Example 1, gives a piston skirt deposit rating of 10.0.

The compositions of this invention are useful in lubricants in which there are present other additives such as supplemental detergents of the ash-containing type viscosity index improving agents, pour point depressant agents, anti-foam agents, extreme pressure agents, rust inhibiting agents, oxidation inhibiting agents and corrosion inhibiting agents. These additives may be present in the lubricant at concentrations ranging from 0.1% to about 20% by weight.

The ash-containing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium, and barium.

The term "basic salt" is used to designate the metal salts wherein the metal is present in stoichiometrically larger amounts than the organic acid radical. The commonly employed methods for preparing the basic salts involves heating a mineral oil solution of an acid with a stoichiometric excess of a metal neutralizing agent such as the metal oxide, hydroxide, carbonate, bicarbonate, or sulfide at a temperature above 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, Cellosolve, carbitol, ethylene glycol, stearyl alcohol, and cyclohexyl alcohol; amines such as aniline, phenylenediamine, phenothioazine, phenyl-beta-naphthylamine, and dodecylamine. A particularly effective method for preparing the basic salts comprises mixing an acid with an excess of a basic alkaline earth metal neutralizing agent, a phenolic promoter compound, and a small amount of water and carbonating the mixture at an elevated temperature such as 60°–200° C.

A supplemental ashless detergent may likewise be used in the lubricating compositions. It is preferably an acylated polyamine such as is described in U.S. 3,172,892. The acylated polyamine may be formed by the reaction of a high molecular weight hydrocarbon-substituted succinic acid or anhydride, i.e., one having at least about 50 aliphatic carbon atoms in the hydrocarbon substituent, with at least about 0.5 equivalent of an alkylene polyamine such as ethylene diamine or a polyethylene polyamine. Especially useful in the lubricating compositions of this invention is an acylated polyamine obtained by heating at 100°–250° C. a polyisobutene (molecular weight of from about 700 to 5000)-substituted succinic anhydride and about an equivalent amount of a poly-ethylene polyamine having from two to about eight amino groups.

Extreme pressure agents and corrosion-inhibiting and oxidation-inhibiting agents are exemplified by chlorinated aliphatic hydrocarbons such as chlorinated wax; organic sulfides and polysulfides such as benzyl disulfide, bis-(chlorobenzyl)disulfide, dibutyl tetrasulfide, sulfurized sperm oil, sulfurized methyl ester of oleic acid, sulfurized alkylphenol, sulfurized dipentene, and sulfurized terpene; phosphosulfurized hydrocarbons such as the reaction product of a phosphorus sulfide with terpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dipentyl phenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl substituted phenyl phosphite; metal thiocarbamates such as zinc dioctyldithiocarbamate, and barium heptylphenyl dithiocarbamate. Group II metal phosphorodithioates such as zinc dicyclohexylphosphorodithioate, zinc dioctylphosphorodithioate, barium di(heptylphenyl)-phosphorodithioate, cadmium dinonylphosphorodithioate, and zinc salt of a phosphorodithioic acid produced by the reaction of phosphorus pentasulfide with an equimolar mixture of isopropyl alcohol and n-hexyl alcohol.

The following examples are illustrative of the lubricating compositions of this invention (all percentages are by weight):

*Example I*

SAE 20 mineral lubricating oil containing 0.5% of the composition of Example 1.

*Example II*

SAE 30 mineral lubricating oil containing 0.75% of the composition of Example 2 and 0.1% of phosphorus as the barium salt of di-n-nonylphosphorodithioic acid.

*Example III*

SAE 30 mineral lubricating oil containing 5% of the composition of Example 5, 0.1% of phosphorus as the zinc salt of a mixture of equimolar amounts of di-isopropylphosphorodithioic acid and di-n-decylphosphorodithioic acid, and 2.5% of sulfate ash as a basic barium detergent prepared by carbonating at 150° C., a mixture comprising mineral oil, barium didodecylbenzene sulfonate and 1.5 moles of barium hydroxide in the presence of a small amount of water and 0.7 mole of octylphenol as the promoter.

*Example IV*

SAE 10W–30 mineral lubricating oil containing 6% of the composition of Example 6, 0.075% of phosphorus as zinc di-n-octylphosphorodithioate, and 5% of the barium salt of an acidic composition prepared by the reaction of 1000 parts of a polyisobutene having a molecular weight of 60,000 with 100 parts of phosphorus pentasulfide at 200° C. and hydrolyzing the product with steam at 150° C.

*Example V*

SAE 20 mineral lubricating oil containing 3% of an acylated polyamine obtained by heating at 150°–200° C. 1 equivalent of a polyisobutene (molecular weight of 1000)-substituted succinic anhydride and 1 equivalent of an ethylene amine mixture having an average composition corresponding to tetraethylene pentamine, 1% of zinc dioctylphosphorodithioate and 2% of the composition of Example 1.

What is claimed is:
1. A composition comprising (A) a boron-containing product obtained by the reaction of a hydrocarbon-substituted succinic acid compound having at least about

50 aliphatic carbon atoms in the hydrocarbon substituent, at least about 0.5 equivalent of an alkylene amine, and at least about 0.1 equivalent of a boron reactant selected from the class consisting of boron acids, boron oxide, ammonium salts of boron acids, and esters of boron acids with monhoydric alcohols and (B) from about 0.01 to about 3 moles, per mole of boron in said boron-containing product of (A), of a phosphatide.

2. The composition of claim 1 wherein the alkylene amine of (A) is an ethylene amine.

3. The composition of claim 1 wherein the alkylene amine of (A) is a polyethylene polyamine.

4. The composition of claim 1 wherein the hydrocarbon-substituted succinic acid compound of (A) is a polyisobutene-substituted succinic anhydride.

5. The composition of claim 1 wherein the boron reactant of (A) is boric acid.

6. The composition of claim 1 wherein the substance of (B) is a lecithin.

7. The composition of claim 1 wherein the substance of (B) is soybean lecithin.

8. The composition comprising (A) a boron-containing product obtained by the reaction of an olefin polymer-substituted succinic anhydride in which the olefin polymer substituent has a molecular weight from about 750 to 5000, from about 1 to about 3 equivalents of a polyethylene polyamine, and from about 1 to 3 equivalents of boric acid and (B) from about 0.01 to 3 moles, per mole of boron in said boron-containing product of (A), of soybean lecithin.

9. A composition prepared by the process comprising heating at a temperature of at least about 100° C. (A) a boron-containing product obtained by the reaction of a hydrocarbon-substituted succinic acid compound having at least about 50 aliphatic carbon atoms in the hydrocarbon substituent, at least about 0.5 equivalent of an alkylene amine, and at least about 0.1 equivalent of a boron reactant selected from the class consisting of boron acids, boron oxide, ammonium salts of boron acids, and esters of boron acids with monohydric alcohols and (B) from about 0.01 to about 3 moles, per mole of boron in said boron-containing product of (A), of a phosphatide.

10. A composition prepared by the process comprising heating at a temperature of at least about 100° C. (A) a boron-containing product obtained by the reaction of an olefin polymer-substituted succinic anhydride in which the olefin polymer substituent has a molecular weight from about 750 to 5000, from about 1 to about 3 equivalents of a polyethylene polyamine, and from about 1 to 3 equivalents of boric acid and (B) from about 0.01 to 3 moles, per mole of boron in said boron-containing product of (A), of a lecithin.

11. A composition prepared by the process comprising heating at a temperature of at least about 100° C. (A) a boron-containing product obtained by the reaction of a polyisobutene-substituted succinic anhydride in which the polyisobutene substituent has a molecular weight of from about 750 to 5000, from about 1 to 3 equivalents of tetraethylene pentamine, and from about 1 to 2 equivalents of boric acid and (B) from about 0.1 to 2 moles, per mole of boron in said boron-containing product of (A), of soybean lecithin.

12. A composition prepared by the process comprising heating at a temperature of at least about 100° C. (A) a boron-containing product obtained by the reaction of a polyisobutene-substituted succinic anhydride in which the polyisobutene substituent has a molecular weight of from about 750 to 5000, from about 1 to 3 equivalents of tetraethylene pentamine, and from about 1 to 3 equivalents of boric acid and (B) from about 0.1 to 2 moles, per mole of boron in said boron-containing product of (A), of rapeseed lecithin.

13. A lubricating composition comprising a major proportion of a lubricating oil and a minor proportion of the composition of claim 1.

14. A lubricating composition comprising a major proportion of a lubricating oil and a minor proportion of the composition of claim 11.

15. A lubricating composition comprising a major proportion of a lubricating oil and a minor proportion of the composition of claim 12.

References Cited by the Examiner
UNITED STATES PATENTS

| | | | |
|---|---|---|---|
| 2,270,241 | 1/1942 | Adams et al. | 252—49.9 X |
| 2,749,310 | 6/1956 | Williams et al. | 252—25 X |
| 3,087,936 | 4/1963 | Le Suer | 252—49.6 X |

DANIEL E. WYMAN, *Primary Examiner.*

W. H. CANNON, *Assistant Examiner.*